(12) United States Patent
Cipolla et al.

(10) Patent No.: US 6,923,074 B2
(45) Date of Patent: Aug. 2, 2005

(54) BALL VALVE WITH FLOW-RATE GAUGE INCORPORATED DIRECTLY IN THE BALL

(75) Inventors: Giovanni Cipolla, Cremona (IT); Ernesto Benini, Verona (IT); Andrea Lazzaretto, Padua (IT)

(73) Assignee: Enolgas Bonomi S.p.A. (IT)

( * ) Notice: Subject to any disclaimer, the term of this patent is extended or adjusted under 35 U.S.C. 154(b) by 0 days.

(21) Appl. No.: 10/428,971

(22) Filed: May 2, 2003

(65) Prior Publication Data

US 2003/0205095 A1 Nov. 6, 2003

(30) Foreign Application Priority Data

May 3, 2002 (IT) ..................................... BS2002A0046

(51) Int. Cl.⁷ .................................................. G01F 1/22
(52) U.S. Cl. .................. 73/861.55; 73/861.52
(58) Field of Search .......................... 73/861.55, 861.53, 73/861.52, 168; 137/487.5, 614.17; 251/315.16, 118, 315.01; 138/40, 44

(56) References Cited

U.S. PATENT DOCUMENTS

| | | | |
|---|---|---|---|
| 3,209,779 A | * 10/1965 | McGowen, Jr. | 137/327 |
| 3,591,129 A | * 7/1971 | Hulsey | 251/118 |
| 3,826,281 A | * 7/1974 | Clark | 137/625.31 |
| 4,402,485 A | * 9/1983 | Fagerlund | 251/118 |
| 4,610,273 A | * 9/1986 | Bey | 137/625.32 |
| 5,205,533 A | * 4/1993 | Berchem | 473/312 |
| 5,209,258 A | * 5/1993 | Sharp et al. | 137/343 |
| 5,533,549 A | * 7/1996 | Sherman | 137/557 |
| 5,551,467 A | * 9/1996 | Booth et al. | 137/1 |
| 5,593,135 A | * 1/1997 | Lester et al. | 251/209 |
| 5,937,890 A | * 8/1999 | Marandi | 137/271 |
| 6,161,350 A | * 12/2000 | Espinosa | 52/293.3 |
| 6,491,056 B2 | * 12/2002 | Gibb | 137/271 |

* cited by examiner

Primary Examiner—Harshad Patel
(74) Attorney, Agent, or Firm—Strasburger & Price LLP

(57) ABSTRACT

A fluid-flow measuring ball valve includes a replaceable ball within a housing. The replaceable ball includes a flow restriction calibrated to the characteristics of the fluid. Pressure ports on either side of the ball provide for obtaining pressure readings which can be used to determine fluid flow.

8 Claims, 1 Drawing Sheet

BALL VALVE WITH FLOW-RATE GAUGE INCORPORATED DIRECTLY IN THE BALL

CROSS-REFERENCE TO RELATED APPLICATIONS

This application claims the priority benefit of Italian Application for Patent, Serial No. BS2002A000046, entitled "Ball Valve With Flow-Rate Gauge Incorporated Directly In The Ball," filed on May 3, 2002, which is hereby incorporated by reference.

STATEMENT REGARDING FEDERALLY SPONSORED RESEARCH/DEVELOPMENT

Not Applicable

FIELD

The present invention is related to ball valves, and more particularly to a ball valve which incorporates a flow-rate detector system that provides for the reading of flow-rate information on a device outside the ball valve.

BACKGROUND

The use of ball valves is well known in many industries. What has not been known is how to accurately obtain readings of the flow-rate of a fluid passing through an on-off valve and in particular an on-off valve such as a ball valve. To determine accurate flow-rate information, instruments outside an on-off valve have been implemented, however, such implementations require complex connections which connections restrict the utility of the valve. Additionally, such prior art solutions for the reacting of flow-rate information present the inconvenience that the reading of the flow-rate information for each single valve is entrusted to a dedicated means of measurement. The dedicated means of measurement used with an on-off valve is dependent on the fluid which passes through the valve, specifically with regard to the type of fluid passing through the valve, and the quantity of fluid passing through the valve.

Other methods for the reading flow-rate inside an on-off valve have been proposed, such as for example the solution anticipated in the European Patent, Serial No. EP 0671578. In such a situation, however, an alteration of the actual flow-rate occurs as a result of the physical structure of the flow-rate measurement equipment. Consequently, the flow-rate reading itself is oftentimes inaccurate.

Therefore, there remains a need in the art for an improvement of the ability of an on-off valve, such as a ball valve, to obtain an accurate reading of flow-rate.

SUMMARY

The present invention describes a ball valve with a flow-rate gauge incorporated therein. The ball portion of the ball valve includes a calibrated borehole which constitutes a constriction to the passage of the fluid therethrough. The valve also includes two positionable pressure ports placed before and after the ball respectively, to provide measurements indicative of the flow-rate of the fluid that passes through the ball valve.

BRIEF DESCRIPTION OF THE DRAWING FIGURES

For a more complete understanding of the present invention, and for further details and advantages thereof, reference is now made to the following Detailed Description of the Embodiments taken in conjunction with the following drawing figures, in which.

DETAILED DESCRIPTION OF THE EMBODIMENTS

Figure 1:
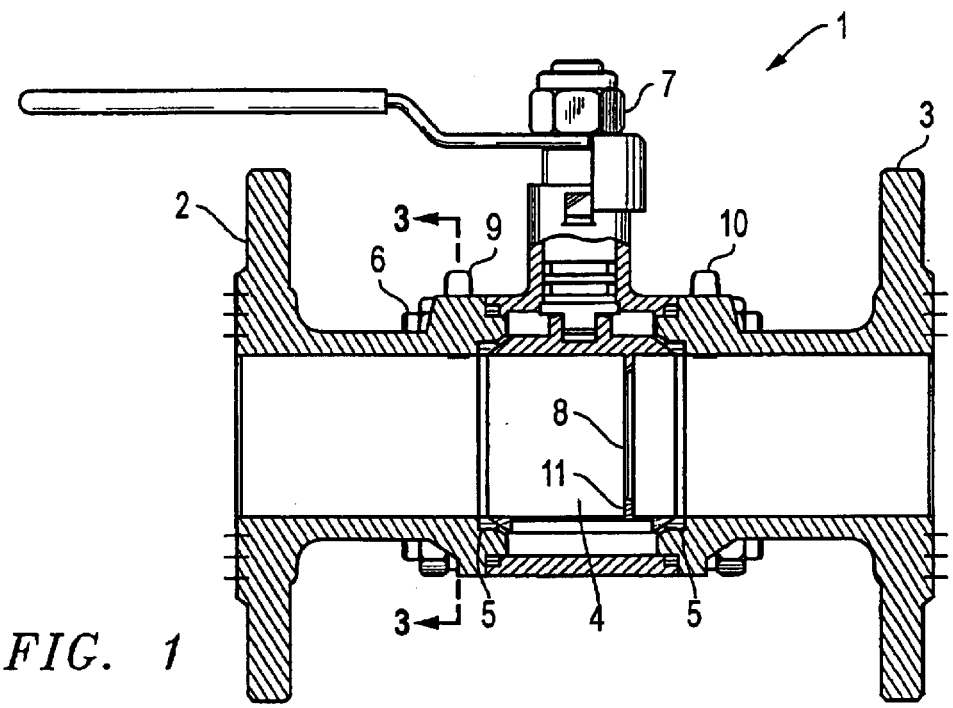
FIG. 1 is a front view in partial section of a ball valve according to the present invention.

In the description which follows, like parts are marked throughout the specification and drawings with the same numerals. The drawing figures are not necessarily drawn to scale and certain portions of the disclosed invention may be shown in exaggerated or in generalized form in the interest of clarity and conciseness.

Figure 2:
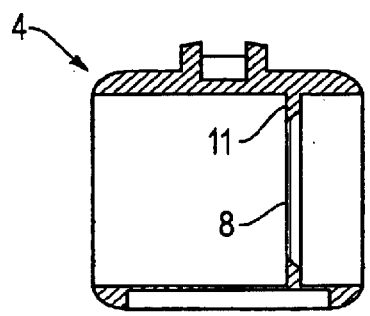
FIG. 2 is a top view of the ball valve according to the present invention.
Figure 3:
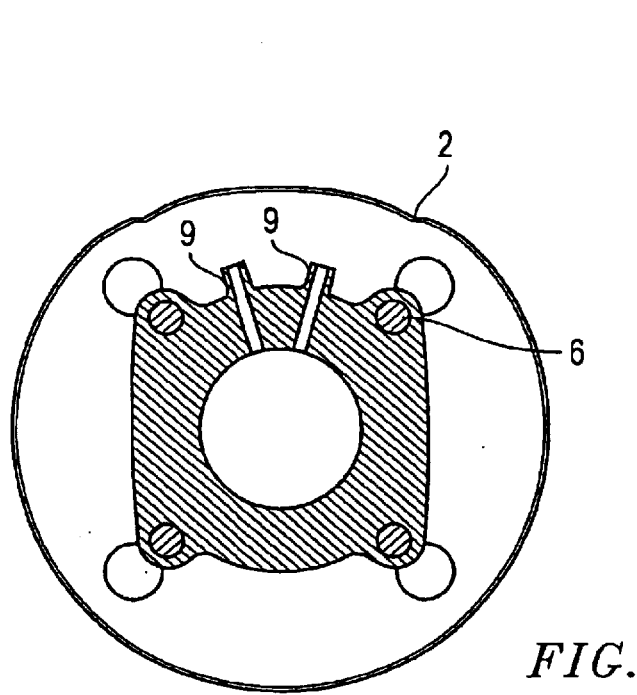
FIG. 3 is an end view in partial section of the ball valve showing pressure ports.

Referring now to FIGS. 1, 2 and 3, the ball valve 1 with flow rate gauge of the present invention is shown. The ball valve 1 is shown in its entirety with two outer flanged ends 2 and 3. Outer flanged ends 2 and 3 allow for the removal of the valve 1 from a system of pipes (not shown) and replacement, where necessary, of ball 4. The ball valve 1 is lodged in position by means of composite annular seals 5 located on either side of the ball 4. Such valve construction is well-known. The ball valve 1 is equipped with tie-rods 6 which allow for simple and safe dismantling and re-mounting of the ball valve 1.

It is anticipated that the ball valve 1 will have a centrally located ball 4 within a housing 12, operated by means of an pin 7; and a restriction plate 8, machined inside the ball 4. The restriction plate 8 is formed by boring the ball 4 so as to achieve a partition 11 therein. The partition 11 delimits the restriction 8. The boring operation produces a flow path through the ball 4 which is parallel to the axis of the valve. The borehole 8 is exactly calibrated so as to obtain a flow constriction calibrated to the passage of the fluid that runs through the valve. This calibration of the borehole 8 makes it possible to predetermine an assigned differential value of the pressure between the beginning and the end of the flow constriction, which differential value of pressure is calibrated with respect to the direction of flow of the fluid.

Additionally, before and after the ball 4, there are two positionable pressure ports, 9 and 10. The two positionable pressure ports 9 and 10 are lodged on to the two outer flanged ends 2 and 3. These positionable pressure ports 9 and 10 allow for the measuring of the pressure at the beginning and the end of the calibrated restriction plate 8 with respect to the flow of the fluid and therefore allow for the measurement of the flow-rate by determining the difference in pressure caused by pressure measuring transducers located in pressure ports 9 and 10. If the fluid is a gas, the two pressure ports 9 and 10 are positioned above the ball 4. If the fluid is a liquid, the two pressure ports 9 and 10 are positioned below the ball 4. The two positionable pressure ports 9 and 10, combined with the symmetry of the tie-rods 6 of the valve, can be axially positioned, depending on the flow parameters of the fluid and the type of fluid for which the measurement of the flow-rate must be taken. In the same way, by removal of the outer flanged ends 2 and 3, the ball 4 can be replaced. Therefore, depending on the thermodynamic and fluid-dynamic characteristics of the fluid, a ball 4 with a properly calibrated borehole 8 for the fluid to be measured may be inserted into the housing 12 of the ball valve 1.

In an alternate embodiment, the ball valve 1 can be equipped with connections for various different types of transducers to enable reading and transmitting of relevant measured flow-rate information. In another alternate embodiment, an actuator can be connected to the pin 7 of the ball valve 1 for remote activation depending on the measured flow-rate information and, therefore, for closing or opening in accordance with predetermined fluid-flow requirements.

Other embodiments of the disclosed invention will be apparent to those skilled in the art after considering this specification or practicing the disclosed invention. The specification and examples above are exemplary only, with the true scope of the invention being indicated by the following claims.

What is claimed is:

1. A fluid-flow measuring ball valve comprising:
    a housing;
    a replaceable ball contained within said housing;
    an actuator for turning said replaceable ball within said housing;
    said replaceable ball including a calibrated orifice formed within said replaceable ball, wherein said calibrated orifice is constructed and arranged to be a constriction to the passage of a fluid that passes through said replaceable ball;
    a first pressure port positioned in said housing upstream from said replaceable ball; and
    a second pressure port positioned in said housing downstream from said replaceable ball.

2. The fluid-flow measuring ball valve of claim 1 further comprising:
    a first flanged end and 2 second flanged end connected to opposite sides of said housing;
    first and second tie-rods enabling the dismantling of the fluid-flow measuring ball valve and replacement of said replaceable ball with a second ball including a borehole whose calibration is determined the dynamic or thermodynamic characteristics of the fluid.

3. The fluid-flow measuring ball valve of claim 1, wherein said first and second pressure ports can be rotated with respect to said housing.

4. The fluid-flow measuring ball valve of claim 3, wherein the rotation of the two pressure intake includes rotating the two pressure intakes to a position above the ball for measurement of the flow rate of a gas.

5. The fluid-flow measuring ball valve of claim 3, wherein the rotation of the two pressure intake includes rotating the two pressure intakes to a position below the ball for measurement of the flow rate of a liquid.

6. The fluid-flow measuring ball valve of claim 1, wherein the measurement of the flow rate includes the measurement of the flow-rate of a gas.

7. The fluid-flow measuring ball valve of claim 1, wherein the measurement of the flow rate includes the measurement of the flow-rate of a liquid.

8. The fluid-flow measuring ball valve of claim 1, wherein the measurement of the flow rate includes the measurement of fluids with different dynamic and thermodynamic characteristics.

* * * * *